US008247585B2

(12) United States Patent
Pendleton et al.

(10) Patent No.: US 8,247,585 B2
(45) Date of Patent: Aug. 21, 2012

(54) SYSTEMS AND METHODS FOR REMOVING CATALYST AND RECOVERING FREE CARBOXYLIC ACIDS AFTER TRANSESTERIFICATION REACTION

(75) Inventors: Justin Pendleton, Salt Lake City, UT (US); Sai Bhavaraju, West Jordan, UT (US); Kean Duffey, Salt Lake City, UT (US)

(73) Assignee: Ceramatec, Inc, Salt Lake City, UT (US)

( * ) Notice: Subject to any disclaimer, the term of this patent is extended or adjusted under 35 U.S.C. 154(b) by 208 days.

(21) Appl. No.: 12/836,224

(22) Filed: Jul. 14, 2010

(65) Prior Publication Data

US 2011/0015419 A1   Jan. 20, 2011

Related U.S. Application Data

(60) Provisional application No. 61/225,437, filed on Jul. 14, 2009, provisional application No. 61/234,694, filed on Aug. 18, 2009.

(51) Int. Cl.
C11B 7/00 (2006.01)
(52) U.S. Cl. ........................................... 554/202
(58) Field of Classification Search .................. 554/205
See application file for complete search history.

(56) References Cited

U.S. PATENT DOCUMENTS

| | | | |
|---|---|---|---|
| 5,288,472 A | 2/1994 | Ruiz | |
| 6,608,184 B2 | 8/2003 | Blount | |
| 2004/0121436 A1 | 6/2004 | Blount | |
| 2008/0193365 A1* | 8/2008 | Coustry et al. | 423/421 |
| 2009/0165366 A1 | 7/2009 | Jovanovic et al. | |

OTHER PUBLICATIONS

Jeong, Sei J., "International Search report", (Feb. 15, 2011),1-3.
Jeong, Sei J., "Written Opinion of the International Searching Authority", (Feb. 15, 2011),1-3.

* cited by examiner

*Primary Examiner* — Deborah D Carr
(74) *Attorney, Agent, or Firm* — David Fonda

(57) ABSTRACT

Systems and methods for using carbon dioxide to remove an alkali catalyst and to recover free carboxylic acids after a transesterification reaction are disclosed. Generally, the methods include first providing a mixture resulting from the transesterification of an ester, wherein the mixture includes substances selected from the alkali catalyst, an alcohol, and a transesterification reaction product such as biodiesel. Second, the methods generally include adding carbon dioxide to the mixture. In some cases, adding the carbon dioxide to the mixture causes the alkali catalyst to convert into an alkali carbonate and/or an alkali bicarbonate. In other cases, adding the carbon dioxide to the mixture causes the carboxylic acid alkali salt to convert into a free carboxylic acid. In either case, the alkali carbonate, the alkali bicarbonate, and/or the free carboxylic acid can be separated from the mixture in any suitable manner.

26 Claims, 4 Drawing Sheets

SYSTEMS AND METHODS FOR REMOVING CATALYST AND RECOVERING FREE CARBOXYLIC ACIDS AFTER TRANSESTERIFICATION REACTION

CROSS-REFERENCE TO RELATED APPLICATIONS

This application claims the benefit of U.S. Provisional Application No. 61/225,437, filed Jul. 14, 2009, entitled "Catalyst Removal after Bio-Fuel Production;" and of U.S. Provisional Application No. 61/234,694, filed Aug. 18, 2009, entitled "Fatty Acid Recovery after Bio-Fuel Production," the entire disclosures of which are hereby incorporated by reference.

FIELD OF THE INVENTION

The present invention relates in general to the production of carboxylic acid esters through the transesterification of esters. More particularly, the present invention provides systems and methods using carbon dioxide to remove and recover an alkali catalyst having a basic pH and free carboxylic acids from transesterification reaction products and participants.

BACKGROUND OF THE INVENTION

Fatty acid methyl esters such as biodiesel are an alternative fuel source to petro-diesel, JP-8, and standard gasoline. Moreover, the use of biodiesel is growing in popularity and market penetration in the United States and worldwide. As its name implies, biodiesel is a processed fuel derived from biological sources. Indeed, biodiesel is typically a fuel comprised of fatty acid alky esters of long chain fatty acids that are derived from triglycerides, which are commonly obtained from vegetable oils and animal fats of various origins. As a general rule, biodiesel has the formula R'OOCR, where R' is a straight chain lower alkyl (e.g., $C_1$ to $C_8$) and R is a hydrocarbon chain from $C_8$ to $C_{24}$.

Generally, biodiesel is produced through a transesterification reaction that occurs when a triglyceride is combined with an alcohol and a catalyst to produce fatty acid alkyl esters (biodiesel) and glycerin (which is also known as glycerin and glycerol). In this regard, a homogeneous catalyst comprising an alkali metal and having a basic pH ("alkali catalyst"), such as an alkali alkoxide or an alkali hydroxide, is often used to cause the transesterification reaction to proceed.

As described above, the transesterification reaction may produce a biodiesel and glycerin, which generally separate into two distinct phases. In this regard, some amount of the alkali catalyst and some amount of the alcohol are often dissolved in the lower glycerin phase, while trace amounts of the alkali catalyst can also be found in the upper biodiesel phase. Additionally, where free fatty acids (or fatty acids that are not bound to other molecules) are present in the reaction mixture (e.g., from being added to the reaction with the triglyceride or by being formed as the triglyceride is reacted in the transesterification reaction), the alkali catalyst causes saponification of the free fatty acids to form alkali salts of the fatty acids ("fatty acid alkali salts"). As in the case of the alkali catalyst, some amount of the fatty acid alkali salts is typically contained in the glycerin phase, while trace amounts of the fatty acid alkali salts can be found in the biodiesel phase.

In some conventional processes for producing biodiesel, strong acids are used to wash the products of the transesterification reaction to neutralize the alkali catalyst and/or to recover free fatty acids from the fatty acid alkali salts. The use of strong acids, however, is not without its shortcomings. For example, where strong acids are used to neutralize the alkali catalyst and/or to recover free fatty acids from the fatty acid alkali salts that are present in the glycerin phase, dissolved alkali salts are typically formed in the glycerin phases. In turn, these dissolved alkali salts often have to be removed through one or more additional steps before the glycerin phase can be purified. In another example of a shortcoming associated with the use of strong acids, the use of such acids can require the transportation, storage, and handling of the hazardous chemicals.

In some other conventional processes, water is used to wash the biodiesel and/or the glycerin. Such processes, however, typically result in the formation of a dissolved alkali hydroxide in the glycerin phase. As in the removal of the alkali salts (discussed above), the removal of alkali hydroxides from the glycerin phase often requires one or more additional steps for the purification of the glycerin.

Accordingly, it would be an improvement in the art to provide improved techniques to remove and recover alkali catalysts and free fatty acids from various transesterification reaction products and participants.

BRIEF SUMMARY OF THE INVENTION

The present invention provides systems and methods for removing an alkali catalyst and/or recovering free fatty acids after a reaction involving the transesterification of an ester to produce transesterification reaction products, including without limitation biodiesel, glycerin, esters including without limitation, non fatty acid alkyl esters, fatty acid alkyl esters, esters of polyoils, multiesters (diesters trimesters, etc) alcohols, ethers, and the like. Accordingly, in some non-limiting implementations, the transesterification reaction involves mixing a suitable ester, an alcohol, and an alkali catalyst.

In the described methods, the transesterification reaction can be performed with any suitable ester, alcohol, and alkali catalyst. In this regard, some non-limiting examples of esters include monoglycerides, diglycerides, triglycerides, carboxylic esters, and the like. Some non-limiting examples of alcohols include methanol, ethanol, propanol, isopropanol, butanol, hexanol, ethylene glycol, propylene glycol, phenol, and naphthol. Indeed, in some non-limiting implementations the alcohol is selected from methanol and ethanol. Additionally, some non-limiting examples of suitable alkali catalysts include metal hydroxides (such as sodium hydroxide, potassium hydroxide, aluminum hydroxide, and/or magnesium hydroxide) and metal alkoxides (such as a sodium alkoxide, a potassium alkoxide, aluminum alkoxide, and/or a magnesium alkoxide). For instance, in some non-limiting implementations, the alkali catalyst is selected from sodium hydroxide and sodium methoxide.

As a result of the transesterification reaction, a mixture is obtained, which may include substances selected from, but not limited to, the alkali catalyst, an alcohol, and a transesterification reaction product. In one embodiment the transesterification reaction products include a glycerin and a biodiesel, and the mixture includes the alkali catalyst, an alcohol, a carboxylic acid alkali salt (formed from free carboxylic acids), water, glycerin, and a biodiesel. In one embodiment, the carboxylic acid is a fatty acid.

In some non-limiting implementations, the methods further include adding carbon dioxide to the mixture. In some cases, adding the carbon dioxide to the mixture causes the alkali catalyst to be converted into an alkali carbonate and/or an alkali bicarbonate. In other cases, adding the carbon dioxide to the mixture causes the carboxylic acid alkali salts to convert into free carboxylic acids. In either case, the alkali carbonate, the alkali bicarbonate, and/or the free fatty acid can be separated from the mixture in any suitable manner.

In the embodiments described herein throughout, the $CO_2$ can be added in various forms. For example, the $CO_2$ can be added in gaseous form, liquid $CO_2$ form, or solid dry-ice form. In one embodiment, the $CO_2$ is added in the form of carbonic acid ($H_2O+CO_2$), or as a mixture of methanol and $CO_2$, or as $CO_2$ dissolved in alcohols, or $CO_2$ dissolved in a solvent with high $CO_2$ uptake capacity.

While the described systems and methods have been found to be particularly useful for the removal of an alkali catalyst and the recovery of a free fatty acid from a mixture that results from a transesterification reaction that produces a biodiesel and glycerin, the described methods may be modified to allow an alkali catalyst to be removed, or to allow a free carboxylic acid to be recovered, from a mix of chemicals that is produced by any other suitable transesterification reaction. Indeed the teachings of the present invention may be used to remove one or more chemicals after a transesterification reactions, where the chemicals may include a catalyst, a carboxylic acid, or other useful components or products produced from the transesterification reaction. This recovery or removal will allow for reduced cost through recycling or otherwise using the chemical recovered or removed, or recycling or otherwise using the material from which the chemical was recovered or removed.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

Figure 3:
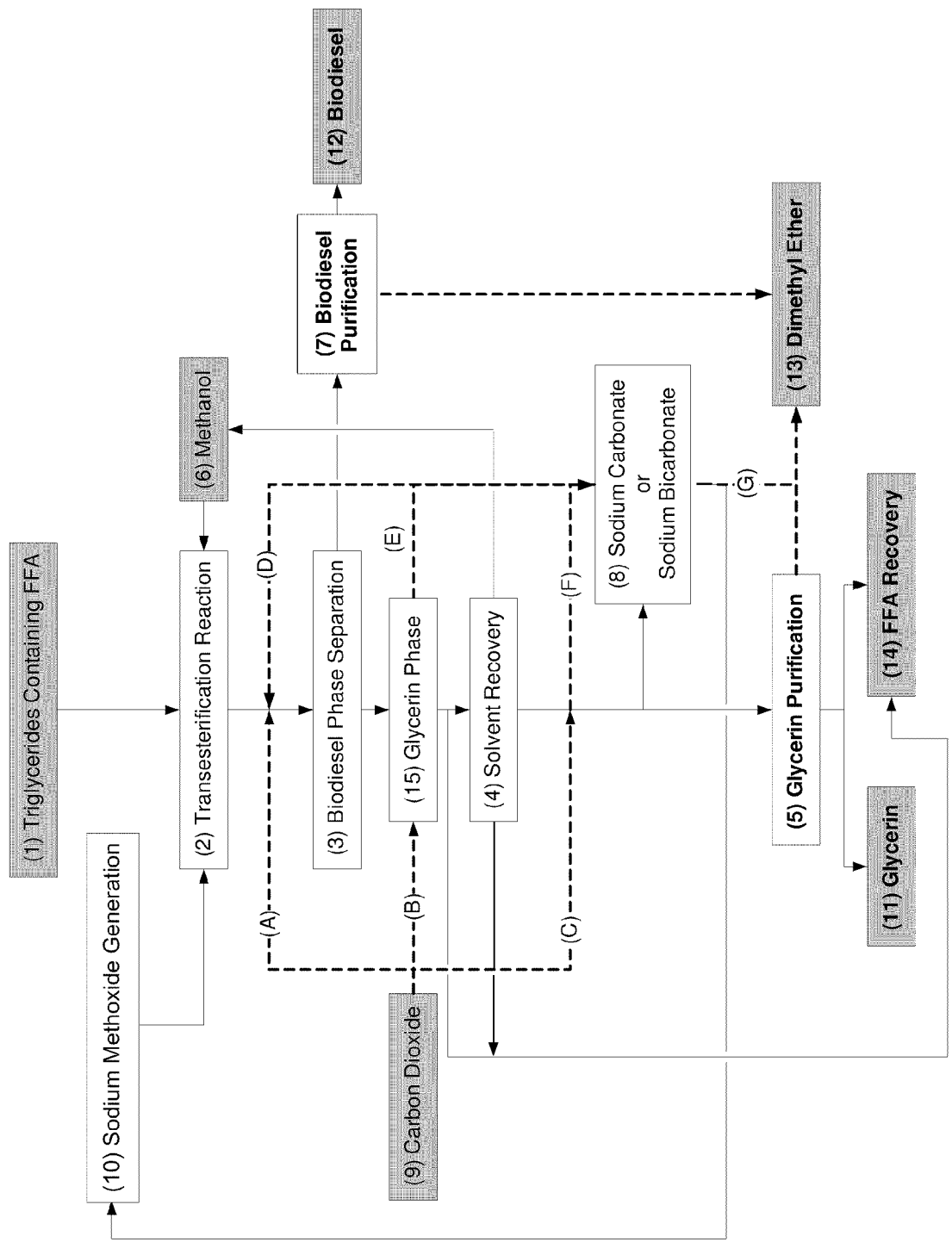
Figure 4:
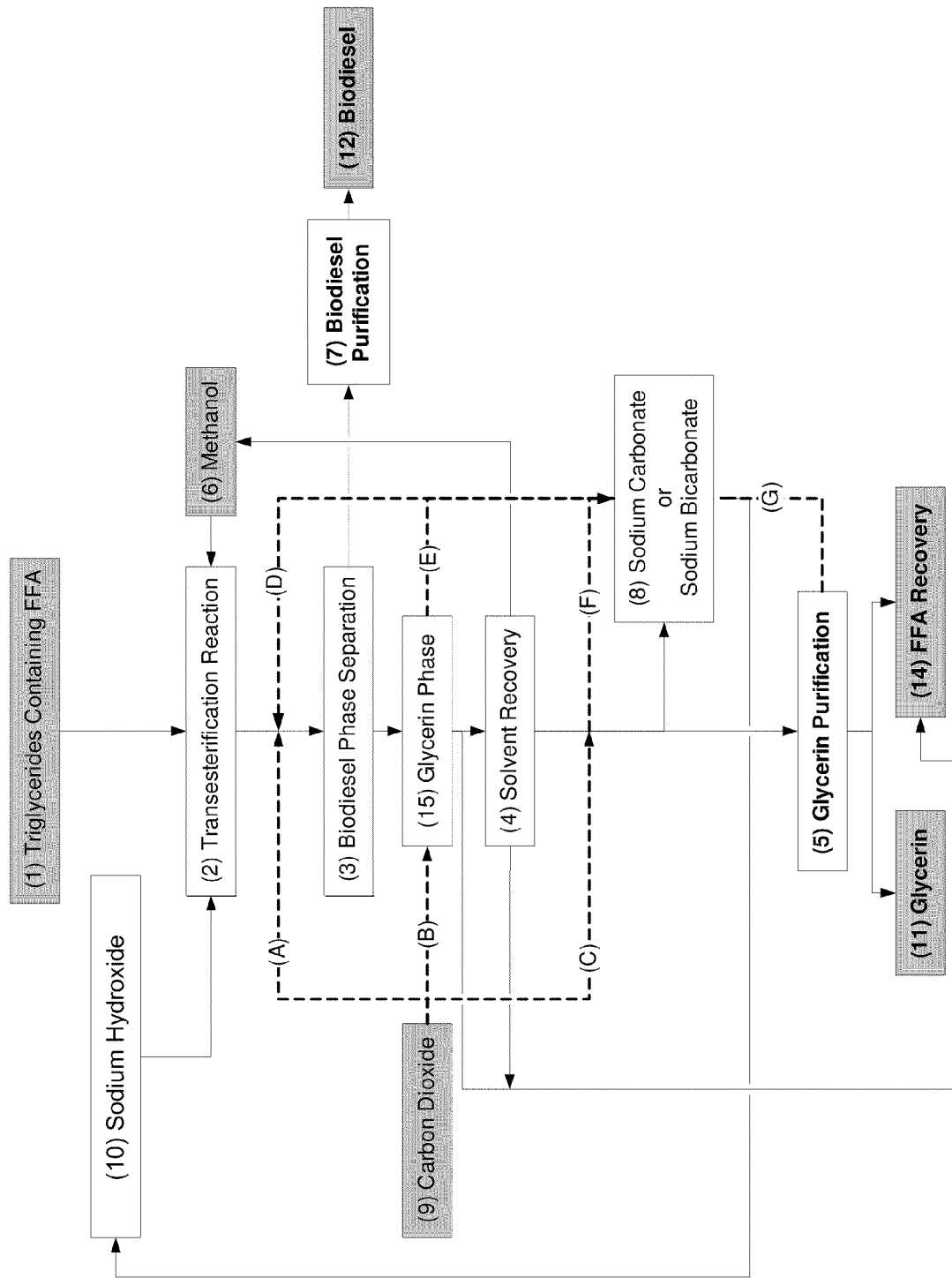

FIG. 3 depicts a representative embodiment of a process flow diagram showing a method for performing a transesterification reaction, wherein sodium methoxide is used as an alkali catalyst and carbon dioxide is used to convert fatty acid alkali salts into free fatty acids; and FIG. 4 depicts a representative embodiment of a process flow diagram showing a method for performing a transesterification reaction, wherein sodium hydroxide is used as the alkali catalyst and carbon dioxide is used to convert the fatty acid alkali salts into free fatty acids.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, steps, processes, or characteristics of the invention may be combined in any suitable manner in one or more embodiments. In the following description, numerous specific details are provided, such as examples of suitable alkali catalysts, alcohols, triglycerides, etc., to provide a thorough understanding of embodiments of the invention. One having ordinary skill in the relevant art will recognize, however, that the invention may be practiced without one or more of the specific details, or with other methods, components, materials, steps, processes, and so forth. In other instances, well-known structures, materials, processes, steps, or operations are not shown or described in detail to avoid obscuring aspects of the invention.

The present invention relates generally to systems and methods for using carbon dioxide to remove an alkali catalyst and/or to recover free carboxylic acids after a reaction that involves the transesterification of one or more esters to produce a transesterification reaction product. In one embodiment, the ester is one or more triglycerides and the transesterification reaction products are biodiesel and glycerin. To provide a better understanding of the described methods, the following discussion provides a more detailed description of the transesterification reaction, the methods for using carbon dioxide to remove the alkali catalyst from a mixture that results from the reaction, and the methods for recovering free carboxylic acids from the mixture.

With respect now to the transesterification reaction, the reaction can be produced by mixing one or more suitable esters, alcohols, and catalysts together to cause a reaction that produces a mixture comprising, among other things, a biodiesel phase and a glycerin phase.

Generally, the esters that are used in the transesterification reaction can comprise any form that can be transesterified to form one or more fatty acid alkyl esters. These esters may include without limitation, monoglycerides, diglycerides, triglycerides, carboxylic esters, and the like. Biodiesel is one example of a fatty acid alkyl esters, but the teachings of this invention can be used as a recovery process for more than just biodiesel production. As used herein, the term transesterified or transesterification may refer to the exchanging of an alkoxyl group of an ester compound for a different alcohol group. Some non-limiting examples of suitable sources of triglycerides can include animal fats (e.g., from beef and sheep tallow, poultry oil, fish oil, etc.), vegetable oil (e.g., from rapeseed, soybeans, Jatropha, mustard, flax, sunflower, palm, hemp, etc.), and other sources of fatty acids (e.g., algae). Additionally, while in some non-limiting embodiments, only a single form of triglyceride (at any suitable concentration) is used for the production of a biodiesel, in other non-limiting embodiments, multiple forms of triglycerides are used at any suitable concentrations.

The alcohol or solvent that is used in the transesterification reaction can comprise virtually any alcohol that allows the ester to be transesterified to form the transesterification reaction product. In some non-limiting embodiments, however, the alcohol is a straight chain, lower alkyl alcohol, $C_1$ to $C_8$, which may be substituted or unsubstituted. Additionally, the alcohol may contain more than one hydroxyl moiety. Examples of typical alcohols that can be used include, but are not limited to, methanol, ethanol, propanol, isopropanol, butanol, hexanol, ethylene glycol, and propylene glycol. Indeed, in some non-limiting embodiments, the alcohol comprises methanol or ethanol. Nevertheless, in other non-limiting embodiments, such as where increased cold flow capability of the biodiesel is desired, somewhat higher alcohols, such as isopropanol or butanol are used. Additionally, while some non-limiting embodiments use only a single alcohol (at any suitable concentration), in other non-limiting embodiments, the transesterification reaction involves more than one alcohol, at any suitable concentration.

The catalyst can comprise any suitable catalyst that allows the transesterification reaction between the ester and the alcohol to proceed. Some examples of suitable catalysts include, but are not limited to, metal alkoxides and metal hydroxides (collectively and individually referred to herein as an "alkali catalyst" or the "catalyst"). Where the alkali catalyst comprises a metal alkoxide, the catalyst can comprise any suitable metal alkoxide, including, without limitation, a sodium alkoxide (e.g., sodium methoxide), a potassium alkoxide, and/or a magnesium alkoxide. Indeed, in some non-limiting embodiments, the catalyst comprises sodium methoxide.

In embodiments in which the alkali catalyst comprises a metal hydroxide, the catalyst can comprise any suitable metal hydroxide, including, without limitation, sodium hydroxide, potassium hydroxide, and/or magnesium hydroxide. Indeed, in some non-limiting embodiments, the catalyst simply comprises sodium hydroxide.

With reference now to the manner in which the transesterification reaction occurs, a non-limiting embodiment of a transesterification reaction that uses methanol as the alcohol and sodium methoxide as the catalyst is discussed below with reference to FIG. 1. While many of the embodiments described herein are for a recovery process where the transesterification products being made include biodiesel, it will be appreciated by those of skill in the art that the catalyst recovery process of the present invention can be used for catalyst recovery or removal where the transesterification products do not include biodiesel. For example, fatty acid methyl esters other than biodiesel can be used as an alternative fuel source to petro-diesel, JP-8, and standard gasoline. Transesterification reaction using base catalysts can also be used to produce valuable fatty alcohols from esters such as triglycerides or used in the synthesis of polyester, in which diesters undergo transesterification with diols to form macromolecules, or for synthesis of higher carbon esters from lower carbon esters or for production of biodegradable Poly (3-hydroxy alkanoate) (PHA) polymers. The teachings of the present invention may also be used to recover catalyst and/or fatty acids in these and other processes.

Figure 1:
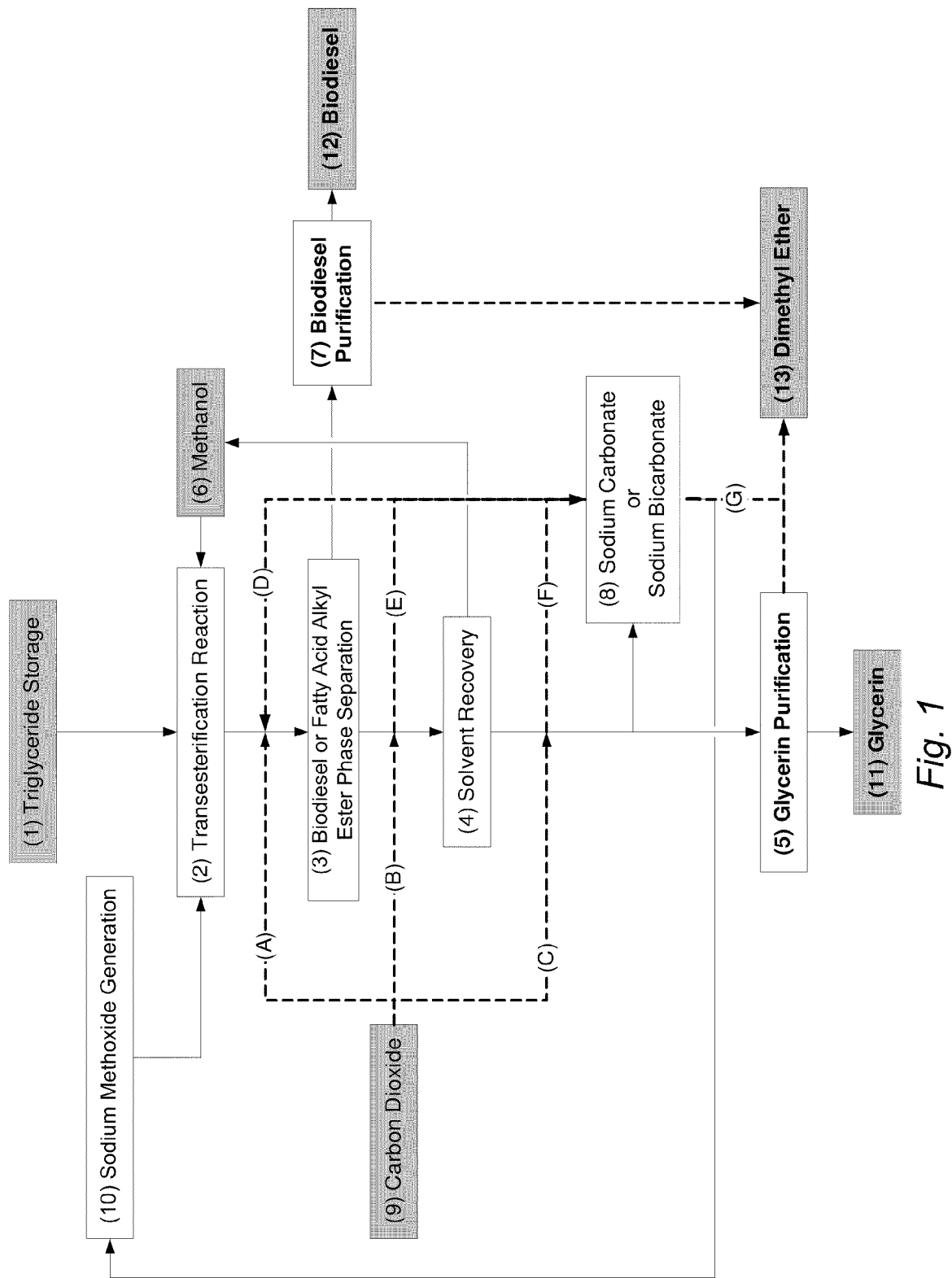
FIG. 1 depicts a representative embodiment of a process flow diagram showing a method in which carbon dioxide is used to convert a sodium methoxide catalyst, which is used in a transesterification reaction, into sodium carbonate, dimethyl ether, and/or sodium bicarbonate.

While the transesterification reaction can proceed in any suitable manner, FIG. 1 shows a non-limiting embodiment in which an ester in the form of a triglyceride (1) (e.g., from storage or any other suitable source) is supplied along with sodium methoxide (10) and methanol (6) to a reactor for the transesterification reaction (2). The chemical reaction for this non-limiting transesterification reaction is summarized below:

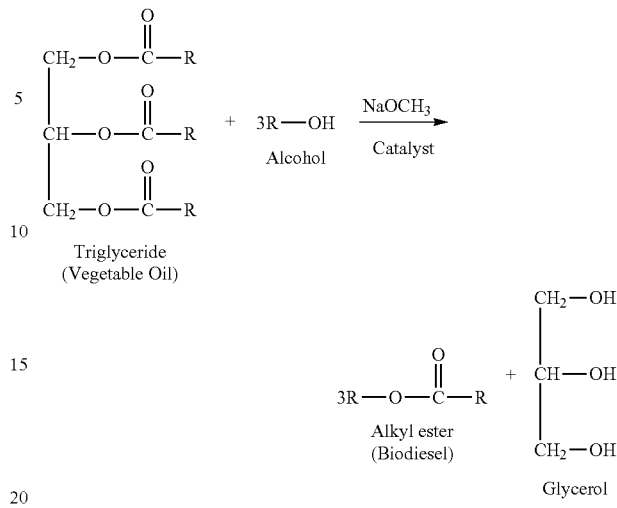

According to some non-limiting embodiments, the products that result from the transesterification reaction shown in FIG. 1 are fatty acid alkyl ester (biodiesel) (12) and glycerin (11), which generally separate to form two distinct phases. In this regard, the glycerin phase often comprises some amount of excess alcohol (e.g., methanol), which was used to complete the transesterification reaction, and some amount of the alkali catalyst. Furthermore, some amount of the alkali catalyst may also be present in the biodiesel phase.

With respect now to the methods for using carbon dioxide to remove the alkali catalyst from a mixture that is produced from the transesterification reaction, the carbon dioxide can be used in any suitable manner to convert the alkali catalyst to an alkali carbonate (or a carbonate comprising an alkali metal) and/or to an alkali bicarbonate (or a bicarbonate comprising an alkali metal). In order to provide a better understanding of how carbon dioxide can be used to convert the catalyst to an alkali carbonate and/or to an alkali bicarbonate, FIGS. 1 and 2 respectively show non-limiting embodiments in which carbon dioxide is used to convert sodium methoxide and sodium hydroxide to sodium carbonate and/or sodium bicarbonate.

With specific reference now to FIG. 1, that figure shows that in several different non-limiting embodiments, the carbon dioxide is added to the mixture of products, unreacted reactants, and participants resulting from the transesterification reaction ("mixture") at different points in the production and purification of the biodiesel and glycerin. Indeed, in a first non-limiting embodiment, FIG. 1 shows that a sufficient amount of carbon dioxide (9) is introduced (at step A) into the two phase mixture comprising the biodiesel, glycerin, alcohol, and sodium methoxide. In this manner, the carbon dioxide is able to react with the sodium methoxide to form sodium carbonate (8) (at step D) and dimethyl ether (13). By way of non-limiting illustration, the reaction between sodium methoxide and the carbon dioxide can occur as follows:

$$2NaOCH_3 + CO_2 \rightarrow Na_2CO_3 + CH_3OCH_3$$

In one embodiment, a sufficient amount of carbon dioxide (9) is introduced (at step A) into the two phase mixture comprising the biodiesel, glycerin, alcohol, and sodium methoxide. In this manner, the carbon dioxide is able to react with the methanol and sodium methoxide to form sodium bicarbonate (8) (at step D) and dimethyl ether (13). By way of non-limiting illustration, the reaction between sodium methoxide, carbon dioxide and methanol can occur as follows:

$$CO_2 + CH_3OH + NaOCH_3 \rightarrow NaHCO_3 + C_2H_6O.$$

If water is also present in the mixture, then the sodium carbonate formed in the reaction shown immediately above can react with the carbon dioxide and the water to form sodium bicarbonate. A non-limiting example of this reaction is shown as follows:

$$Na_2CO_3 + CO_2 + H_2O \rightarrow 2NaHCO_3$$

In either case, the sodium carbonate and/or the sodium bicarbonate (8) are both insoluble in glycerin and biodiesel and will be present in the mixture as solids. The insolubility of the sodium carbonate and the sodium bicarbonate allows them to be separated from the glycerin and/or the biodiesel in any suitable manner, including, without limitation, through filtration, centrifugation, cyclonic separation, evaporation, and/or any other known or novel method that is suitable for separating the sodium carbonate and/or the sodium bicarbonate from the mixture. Thus, as shown above, carbon dioxide can be used to remove the catalyst from the mixture and to otherwise leave the glycerin and/or the biodiesel free of sodium. Additionally, the sodium carbonate and/or the sodium bicarbonate that is recovered from the mixture can be used for any suitable purpose, including, without limitation, to be converted back to the sodium methoxide catalyst (or the sodium hydroxide catalyst, where applicable) either by electrolysis or one or more other suitable methods.

Along these lines, where the carbon dioxide helps form sodium bicarbonate, the production of sodium bicarbonate can remove trace amounts of water in the glycerin. Moreover, where the carbon dioxide helps form the dimethyl ether (or another ether, where applicable), the dimethyl ether can either be removed from the glycerin in any suitable manner and be discarded or added to the biodiesel as a fuel additive to improve the fuel's physical and combustion properties.

In a second non-limiting embodiment showing when the carbon dioxide can be added to the mixture, FIG. 1 shows that after the separation (3) of the biodiesel phase from the glycerin phase (step B), the carbon dioxide is added to the mixture, which comprises glycerin, methanol, and sodium methoxide. In this manner, FIG. 1 shows that the carbon dioxide can convert the sodium methoxide in the glycerin into sodium carbonate and/or sodium bicarbonate (step E).

In a third non-limiting embodiment, FIG. 1 shows that the carbon dioxide is added to the mixture, which comprises glycerin and sodium methoxide, after the recovery (4) of the methanol solvent (step C). Accordingly, FIG. 1 shows that the carbon dioxide can be used to convert sodium methoxide in the glycerin phase (which has been separated from the solvent and the biodiesel) to form sodium carbonate and/or sodium bicarbonate (step F).

In addition to the aforementioned steps and processes, FIG. 1 also shows that any dissolved alkali carbonate (e.g., sodium carbonate) or alkali bicarbonate (e.g., sodium bicarbonate) that is present in the glycerin due to presence of water may be recovered (step G) during the glycerin purification step (5). In this regard, the dissolved sodium carbonate and/or sodium bicarbonate can be recovered through any suitable known or novel method.

Figure 2:
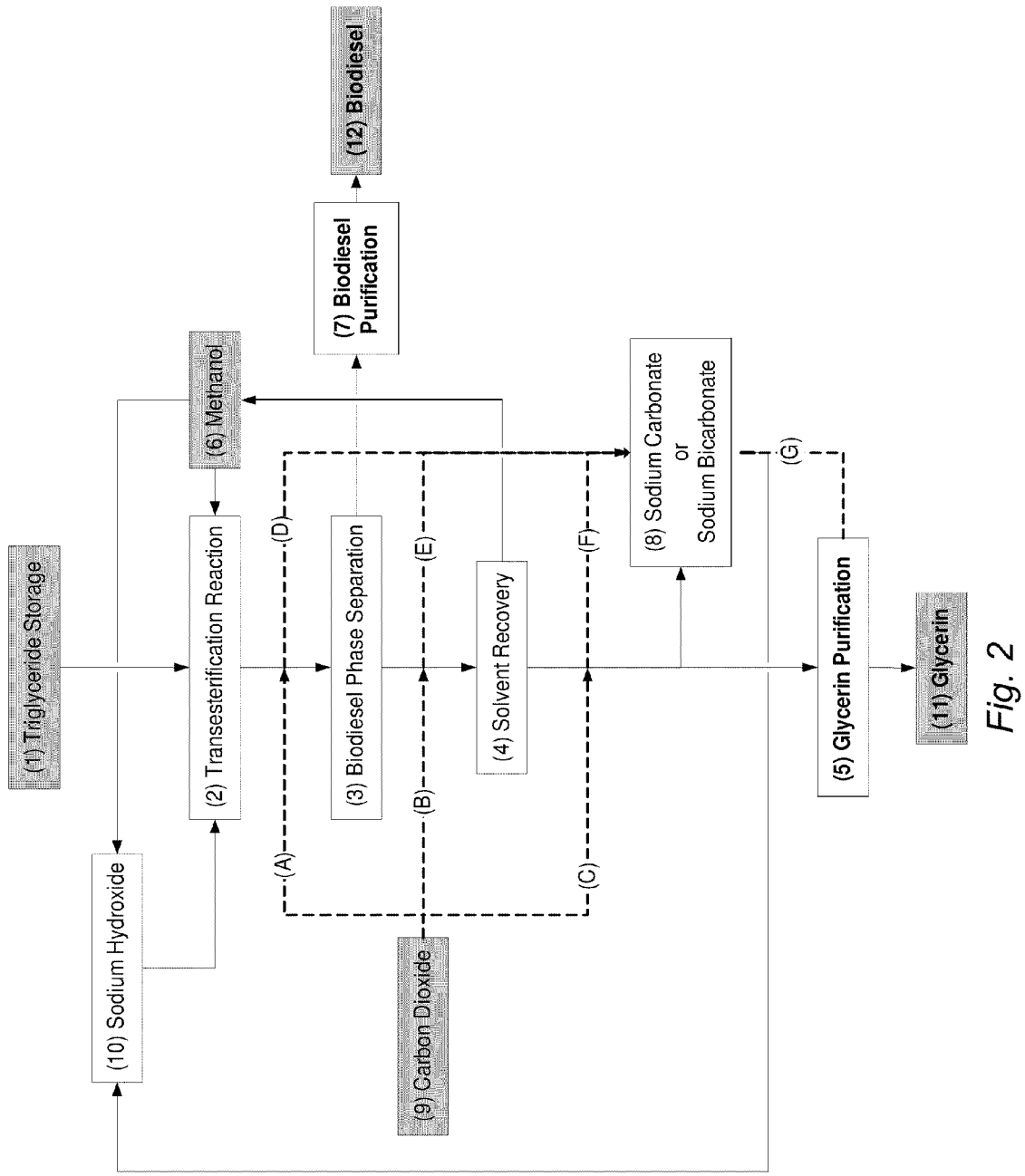
FIG. 2 depicts a representative embodiment of a process flow diagram showing a method in which carbon dioxide is used to convert a sodium hydroxide catalyst, which is used in the transesterification reaction, into sodium carbonate and/or sodium bicarbonate.

With reference now to FIG. 2, that figure shows a non-limiting embodiment of a method for using carbon dioxide to remove the alkali catalyst, wherein the catalyst comprises sodium hydroxide (10). Where sodium hydroxide is used as the catalyst with methanol for the transesterification reaction, the sodium hydroxide can be converted to sodium carbonate in any suitable manner, including, without limitation, through the following reaction:

$$2NaOH + CO_2 \rightarrow Na_2CO_3 + H_2O$$

If water a sufficient amount of water is present in the mixture, then the sodium carbonate that is formed in the immediately preceding reaction can react with carbon dioxide and water to form sodium bicarbonate. As shown in the following reaction, when sodium carbonate reacts with the carbon dioxide, dimethyl ether is not formed—as is the case with sodium methoxide.

$$Na_2CO_3 + CO_2 + H_2O \rightarrow 2NaHCO_3$$

FIG. 2 does show, however, that as in the case of sodium methoxide, the reaction of carbon dioxide with the sodium hydroxide catalyst can occur at any suitable point in the process for producing and purifying the biodiesel and glycerin. By way of non-limiting example, FIG. 2 shows the carbon dioxide (9) may be added to the mixture after transesterification reaction (step A), after the biodiesel is separated from the glycerin phase (step B), and/or after the solvent (e.g., methanol) is recovered (step C).

Turning now to the methods for using carbon dioxide for recovering free fatty acids from the mixture that results from the transesterification reaction, the carbon dioxide can be used in any suitable manner to convert fatty acid alkali salts (which are the result of the saponification of free fatty acids provided with the triglyceride or as the triglyceride is reacted) in the mixture into free fatty acids. In this regard, free fatty acids that are mixed with an alkali catalyst (e.g., sodium methoxide) can be saponified according to the following reaction:

$$R-COOH + NaOCH_3 \rightarrow R-COONa + CH_3OH$$

In contrast, the addition of carbon dioxide and water can convert the fatty acid alkali salts back into free fatty acids, according to the following non-limiting reaction:

$$2R-COONa + H_2O + CO_2 \rightarrow Na_2CO_3 + 2R-COOH$$

As previously stated, the transesterification of a triglyceride results in a biodiesel phase and a separate glycerin phase. As with the solvent (e.g., methanol) and the catalyst (e.g., sodium hydroxide), the fatty acid alkali salts (e.g., sodium salts of the free fatty acids, shown above as R—COONa) tend to be found within the glycerin phase. That said, small amounts of the catalyst and the fatty acid alkali salts can also be present in the biodiesel phase.

To provide a better understanding of how carbon dioxide can be used to convert the fatty acid alkali salts in the glycerin phase and/or the biodiesel phase into free fatty acids, FIGS. 3 and 4 show non-limiting embodiments of transesterification reactions that use sodium methoxide and sodium hydroxide, respectively, as the alkali catalyst, and that use carbon dioxide to convert the fatty acid alkali salts into free fatty acids.

With reference now to FIG. 3, that figure shows that in several different non-limiting embodiments, the carbon dioxide is added to the mixture at different points in the production and purification of the biodiesel and glycerin. Indeed, according to a first non-limiting embodiment of a method for using carbon dioxide to convert fatty acid alkali salts (e.g., R—COONa) into free fatty acids (e.g., R—COOH), FIG. 3 shows that the carbon dioxide (9) is introduced into the two phase mixture (step A), which at least comprises the biodiesel, the glycerin, the alcohol, the catalyst, and the fatty acid alkali salt. In this manner, FIG. 3 shows that the carbon dioxide is able to react with the sodium methoxide catalyst and the fatty acid alkali salts to form sodium carbonate (step D), free fatty acids (FFAs shown at 14), and dimethyl ether (13). A non-limiting example of how this reaction proceeds when water is present in the mixture is shown as follows:

$$2NaOCH_3 + 2R{-}COONa + H_2O + 2CO_2 \rightarrow 2Na_2CO_3 + 2R{-}COOH + CH_3OCH_3$$

In some non-limiting instances, if additional water is present in the mixture, then the sodium carbonate formed in the immediately preceding reaction will react with the carbon dioxide and water to form sodium bicarbonate, according to the following reaction:

$$Na_2CO_3 + CO_2 + H_2O \rightarrow 2NaHCO_3$$

As stated above, both sodium carbonate and sodium bicarbonate (8) are solid and insoluble in the glycerin phase and the biodiesel phase. Accordingly, the sodium carbonate and/or the sodium bicarbonate can be readily removed from the mixture as a solid, or as a suspended or dissolved solid depending upon what the transesterification reaction products are. Furthermore, as mentioned earlier, the formation of sodium bicarbonate also tends to remove trace amounts of water from the glycerin phase.

Like the alkali carbonate (e.g., sodium carbonate) and the alkali bicarbonate (e.g., sodium bicarbonate), free fatty acids that are regenerated during the reaction can be recovered from the mixture and be used for any suitable purpose. In this regard, the free fatty acids can be separated from the mixture in any suitable manner, including, without limitation, through fractional distillation, absorption, centrifugation, extraction, and/or any other suitable method.

In a second non-limiting embodiment of a method for using carbon dioxide to convert fatty acid alkali salts into free fatty acids, FIG. 3 shows that a sufficient amount of carbon dioxide is added to the mixture, which comprises glycerin, methanol, sodium methoxide, and fatty acid alkali salts (e.g., sodium salts of free fatty acids), after the separation (3) of the biodiesel phase (step B). In this manner, FIG. 3 shows that the carbon dioxide is used to respectively convert the fatty acid alkali salts and sodium methoxide that are present in the glycerin phase into free fatty acids and sodium carbonate and/or sodium bicarbonate (step E).

In a third non-limiting embodiment, FIG. 3 shows that the carbon dioxide is added to the mixture after the recovery (4) of the methanol solvent. Accordingly, FIG. 3 shows that (at step C) the fatty acid alkali salts and the sodium methoxide that are present in the glycerin phase are respectively converted into free fatty acids and sodium carbonate and/or sodium bicarbonate (step F).

As shown in step G of FIG. 3, any dissolved sodium carbonate or sodium bicarbonate that is present in the glycerin phase, due to presence of excess water, may also be recovered through a known or novel glycerin purification step (5).

Additionally, the dimethyl ether (13) produced from the process shown in FIG. 3 can be removed from the glycerin phase. In this regard, the dimethyl ether can be removed in any suitable manner, including, without limitation, through the use of a distillation process or any other suitable technique. Once removed from the glycerin phase, the dimethyl ether can be discarded or be used for any other suitable purpose. Indeed, in one non-limiting example, the dimethyl ether is added to the biodiesel as a fuel additive to improve its physical and combustion properties.

With reference now to FIG. 4, that figure shows a non-limiting embodiment of a method for using carbon dioxide to convert fatty acid alkali salts into free fatty acids when the catalyst comprises sodium hydroxide. In embodiments in which sodium hydroxide is used as the catalyst and methanol is used as the solvent in the transesterification reaction, the sodium hydroxide can be converted into sodium carbonate and/or sodium bicarbonate and the fatty acid alkali salts can be converted into free fatty acids in any suitable manner. By way of non-limiting example, a suitable reaction between the sodium hydroxide, the fatty acid alkali salts, carbon dioxide, and water is shown as follows:

$$2NaOH + 2R{-}COONa + H_2O + 2CO_2 \rightarrow 2Na_2CO_3 + 2R{-}COOH + H_2O$$

If additional water is present in the mixture, then the sodium carbonate from the immediately preceding reaction can react with carbon dioxide and water to form sodium bicarbonate. This non-limiting reaction is shown as follows:

$$Na_2CO_3 + CO_2 + H_2O \rightarrow 2NaHCO_3$$

As shown in the preceding two reactions, when sodium hydroxide reacts with carbon dioxide, dimethyl ether is not formed—as is the case with sodium methoxide.

As in the case of sodium methoxide, however, the reaction of the carbon dioxide with the sodium hydroxide catalyst and/or the fatty acid salts can occur at any suitable point in the process illustrated in FIG. 4. By way of non-limiting example, FIG. 2 shows the carbon dioxide (9) is added to the mixture after transesterification reaction (step A), after the biodiesel is separated from the glycerin phase (step B), and/or after the solvent (e.g., methanol) is recovered from the mixture (step C).

While the carbon dioxide in the described methods can be used to convert fatty acid alkali salts to free fatty acids and/or to convert the catalyst to an alkali carbonate and/or an alkali bicarbonate at any suitable pressure and temperature, in some non-limiting embodiments the carbon dioxide converts the catalyst and/or the fatty acid alkali salts at a pressure between about 0 and about 20 atmosphere pressures and at a temperature that is between about −25° C. and about 70° C.

In addition to the aforementioned characteristics, the described methods can be modified in any suitable manner. In one non-limiting embodiment, one or more metal salts of free fatty acids (also referred to herein as fatty acid alkali salts) react to form corresponding metal carbonates and bicarbonates. In such embodiments, the transesterification reaction can involve any suitable metal salt of a fatty acid, including, without limitation, one or more sodium, potassium, and/or magnesium fatty acid alkali salts.

In another non-limiting embodiment, while the described embodiments have focused on using sodium methoxide or sodium hydroxide as the alkali catalyst, the skilled artisan will recognize that in embodiments in which the transesterification reaction involves the use of one or more other alcohols or catalysts, corresponding alkali carbonates, ethers, and/or alkali bicarbonates will form when the catalyst is reacted with the carbon dioxide.

As shown above, the described systems and methods may offer several beneficial characteristics. In one non-limiting example, certain embodiments of the described methods can be practiced without the use a strong acid to neutralize the alkali catalyst. As a result, the described methods can require fewer steps, be safer, and be easier to effectuate than some conventional techniques for producing biodiesel and glycerin. In another non-limiting example, because the current methods may convert the catalyst into an insoluble solid alkali carbonate and/or bicarbonate (as opposed to an alkali salt), the described methods can make the glycerin purification process simpler than the glycerin purification processes found in certain conventional methods for producing biodiesel.

While specific embodiments and examples of the present invention have been illustrated and described, numerous modifications come to mind without significantly departing from the spirit of the invention, and the scope of protection is only limited by the scope of the accompanying claims.

The invention claimed is:

1. A method for removing one or more chemicals after a reaction involving the transesterification of an ester, the method comprising:
   providing a mixture resulting from the transesterification of the ester, wherein the mixture comprises an alkali catalyst, an alcohol, and a transesterification reaction product;
   adding carbon dioxide to the mixture to convert the alkali catalyst into one or more of an alkali carbonate and an alkali bicarbonate; and
   separating the alkali carbonate and/or alkali bicarbonate from the mixture.

2. The method of claim 1, wherein the mixture resulting from the transesterification further comprises a carboxylic acid alkali salt.

3. The method of claim 2, wherein the carbon dioxide converts the carboxylic acid alkali salt into a free carboxylic acid and one or more of an alkali carbonate and an alkali bicarbonate.

4. The method of claim 3, further comprising separating the free carboxylic acid, the alkali carbonate, and/or the alkali bicarbonate from the mixture.

5. The method of claim 1, wherein the mixture comprises water.

6. The method of claim 1, wherein the method comprises adding the carbon dioxide to the mixture to convert the alkali catalyst into a solid phase; and separating the solid phase from the mixture.

7. The method of claim 1, wherein the transesterification reaction product comprises glycerin and biodiesel.

8. The method of claim 1, wherein the alkali catalyst is selected from sodium hydroxide, potassium hydroxide, magnesium hydroxide, aluminum hydroxide, a sodium alkoxide, a potassium alkoxide, a magnesium alkoxide, and an aluminum alkoxide.

9. The method of claim 8, wherein the alkali catalyst is selected from an alkali hydroxide and an alkali alkoxide.

10. The method of claim 1, wherein the alkali catalyst is selected from sodium hydroxide and sodium methoxide.

11. The method of claim 9, wherein the alkali catalyst comprises an alkali methoxide, and wherein adding the carbon dioxide to the mixture forms an ether and the alkali carbonate.

12. The method of claim 5, wherein the water, the carbon dioxide, and the alkali carbonate react to form the alkali bicarbonate.

13. The method of claim 1, wherein the alcohol is selected from methanol and ethanol.

14. The method of claim 1, wherein the mixture results from the transesterification of a triglyceride.

15. The method of claim 1, wherein the transesterification product comprises a carboxylic acid ester and an alcohol.

16. The method of claim 1, wherein the mixture is selected from one or more of a product, an unreacted reactant, and a participant of the transesterification reaction.

17. A method for removing one or more chemicals after a reaction involving the transesterification of an ester, the method comprising:
   providing a mixture resulting from the transesterification of the ester, wherein the mixture comprises an alkali catalyst, an alcohol, a transesterification reaction product, a carboxylic acid alkali salt, and water;
   adding carbon dioxide to the mixture to convert the alkali catalyst into one or more of an alkali carbonate and an alkali bicarbonate and to convert the carboxylic acid alkali salt into a free carboxylic acid and one or more of an alkali carbonate and an alkali bicarbonate;
   separating the alkali carbonate and/or alkali bicarbonate from the mixture; and
   separating the free carboxylic acid from the mixture.

18. The method of claim 17, wherein the method comprises adding the carbon dioxide to the mixture to convert the alkali catalyst into a solid phase; and separating the solid phase from the mixture.

19. The method of claim 17, wherein the alkali catalyst is selected from sodium hydroxide, potassium hydroxide, magnesium hydroxide, aluminum hydroxide, a sodium alkoxide, a potassium alkoxide, a magnesium alkoxide, and an aluminum alkoxide.

20. The method of claim 19, wherein the alkali catalyst is selected from an alkali hydroxide and an alkali alkoxide.

21. The method of claim 20, wherein the alkali catalyst is selected from sodium hydroxide and sodium methoxide.

22. The method of claim 19, wherein the mixture results from the transesterification of a triglyceride.

23. The method of claim 22, wherein the transesterification product comprises a carboxylic acid ester and an alcohol.

24. The method of claim 23, wherein the alcohol is selected from methanol and ethanol.

25. The method of claim 17, wherein the mixture is selected from one or more of a product, an unreacted reactant, and a participant of the transesterification reaction.

26. A method for removing one or more chemicals after a reaction involving the transesterification of an ester, the method comprising:
   providing a mixture resulting from the transesterification of the ester, wherein the mixture comprises an alkali catalyst, an alcohol, a biodiesel, and a glycerin, wherein the alkali catalyst is selected from sodium hydroxide and sodium alkoxide, and wherein the alcohol is selected from methanol and ethanol;
   adding carbon dioxide to the mixture to convert the alkali catalyst into a solid phase selected from an alkali carbonate and an alkali bicarbonate; and
   separating the solid phase from the mixture.

* * * * *